United States Patent
Borella

(10) Patent No.: US 7,286,512 B1
(45) Date of Patent: Oct. 23, 2007

(54) SYSTEM AND METHOD FOR SUPPORTING ALTERNATIVE ADDRESSESSING IN A MOBILE NETWORK

(75) Inventor: Michael S. Borella, Naperville, IL (US)

(73) Assignee: UTStar, Inc., Alameda, CA (US)

( * ) Notice: Subject to any disclaimer, the term of this patent is extended or adjusted under 35 U.S.C. 154(b) by 942 days.

(21) Appl. No.: 10/384,132

(22) Filed: Mar. 7, 2003

(51) Int. Cl.
  *H04Q 7/24* (2006.01)

(52) U.S. Cl. .................. 370/338; 370/331; 370/395.1; 370/328; 370/392; 455/435.1; 709/223

(58) Field of Classification Search ................ 370/328, 370/229, 331, 338, 352, 395.1, 395.3, 392; 455/432.1, 435.1, 435.2, 436–437, 442; 709/249, 709/220, 229
See application file for complete search history.

(56) References Cited

U.S. PATENT DOCUMENTS

| | | | |
|---|---|---|---|
| 6,636,498 B1 * | 10/2003 | Leung | 370/338 |
| 6,978,128 B1 * | 12/2005 | Raman et al. | 455/414.1 |
| 7,039,053 B1 * | 5/2006 | Freed et al. | 370/392 |
| 7,209,978 B2 * | 4/2007 | Thubert et al. | 709/242 |
| 2003/0224788 A1 * | 12/2003 | Leung et al. | 455/435.1 |
| 2004/0117508 A1 * | 6/2004 | Shimizu | 709/249 |
| 2004/0203749 A1 * | 10/2004 | Iyer et al. | 455/432.1 |
| 2005/0165917 A1 * | 7/2005 | Le et al. | 709/220 |
| 2006/0173968 A1 * | 8/2006 | Vaarala et al. | 709/227 |

OTHER PUBLICATIONS

C. Perkins, "IP Mobility Support," Network Working Group, Oct. 1996.
G. Dommety et al., "Mobile IP Vendor/Organization-Specific Extensions," Network Working Group, Apr. 2001.
C. Perkins, "IP Mobility Support for IPv4," Network Working Group, Jan. 2002.
R. Gilligan et al., "Transition Mechanisms for IPv6 Hosts and Routers," Network Working Group, Apr. 1996.
K. Tsuchiya et al., "A Communication Mechanism between IPv4 and IPv6," Internet-Draft, Nov. 1997.

* cited by examiner

*Primary Examiner*—George Eng
*Assistant Examiner*—Kamran Afshar

(57) ABSTRACT

In a method and system of establishing mobile network communications in a network such as a mobile IP network, an agent node receives a registration request message that includes routing address fields such as a home address field, a home agent address field, and a care-of address field. The registration request further includes an extension field. The extension field of the registration request message includes at least one substitute address value. The agent node interprets the registration request message by selecting addresses from the message. When an address value in an address field is a void value, the agent node selects a substitute address value from the extension field. When an address value in the address field is not a void value, the agent node selects the address value in the address field. Using the selected addresses, the agent node establishes a mobile network session with the mobile node.

27 Claims, 4 Drawing Sheets

US 7,286,512 B1

SYSTEM AND METHOD FOR SUPPORTING ALTERNATIVE ADDRESSESSING IN A MOBILE NETWORK

FIELD OF THE INVENTION

The present invention relates to mobile network communications. More particularly, it relates to establishing mobile network communications in a mobile IP network.

BACKGROUND OF THE INVENTION

The Internet Protocol ("IP") is an addressing protocol designed to route traffic within a network or between networks. The Internet Protocol is used on many computer networks including the Internet, intranets and other networks. Internet Protocol addresses are often assigned to "immobile" nodes on a network. An immobile node may be moved to a different computer network, but is typically associated with a static physical location and an immobile Internet protocol address.

Mobile IP protocols allow Internet users to retain the same IP addresses no matter what point of access they use to connect to the Internet. Two such mobile IP protocols are Mobile IPv4 and Mobile IPv6. The former is notable for its support only of the four-byte addresses used in Internet Protocol version 4, whereas the latter supports the sixteen-byte IP addresses that are coming into use with Internet Protocol version 6. Although IP version 6 has certain advantages over version 4—notably its expanded address space—the widespread use of Mobile IPv4 in some applications forestalls the conversion from Mobile IPv4 to Mobile IPv6. One such application is in networks using CDMA2000, the dominant wireless data technology in the United States and Korea. As IPv6 is deployed on other network nodes, however, it will become increasingly important for Mobile IPv4 networks to support the use of IPv6 nodes.

The operation of Mobile IPv4 is described in, for example, the Request for Comment (RFC) "IP Mobility Support," RFC-2002 (October 1996), and "IP Mobility Support for IPv4," RFC-3220 (January 2002), available from the Internet Engineering Task Force (www.ietf.org), the contents of which are incorporated herein by reference. The use of mobile IP in a CDMA 2000 network is described in the Telecommunications Industry Association interim standards "CDMA2000 Wireless IP Network Standard," TIA.IS-835-B (September 2002), and "Interoperability Specification (IOS) for CDMA2000 Access Network Interfaces," TIA/EIA/IS-2001.7-B (May 2002), the contents of which are incorporated herein by reference.

SUMMARY OF THE INVENTION

A method of establishing mobile network communications in a network such as a mobile IP network, an agent node receives a registration request message that requests a mobile networking session with a mobile node. The registration request message includes routing address fields such as a home address field, a home agent address field, and a care-of address field. The registration request further includes an extension field. The extension field of the registration request message includes at least one substitute address value. The agent node interprets the registration request message by selecting address values from the message. The address values may be selected from the routing address fields or the extension fields. For example, when an address value in an address field is a void value, such as the address values 0.0.0.0 or 255.255.255.255, the agent node selects a substitute address value from the extension field. When an address value in the address field is not a void value, the agent node selects the address value in the address field. Using the selected addresses, the agent node establishes a mobile network session with the mobile node.

In the mobile network session, where the agent node is a home agent node, the home agent node receives packet data addressed to the selected home address and forwards that packet data to the care-of address. Where the agent node is a foreign agent node, the agent node receives packet data that has been forwarded to the care-of address and routes that packet data to the mobile node. In one embodiment, the routing address fields are only long enough to store four-byte IPv4 addresses, whereas one or more substitute addresses are IPv6 addresses.

BRIEF DESCRIPTION OF THE DRAWINGS

Exemplary embodiments of the present invention are described with reference to the following drawings, in which.

DETAILED DESCRIPTION

Figure 1:
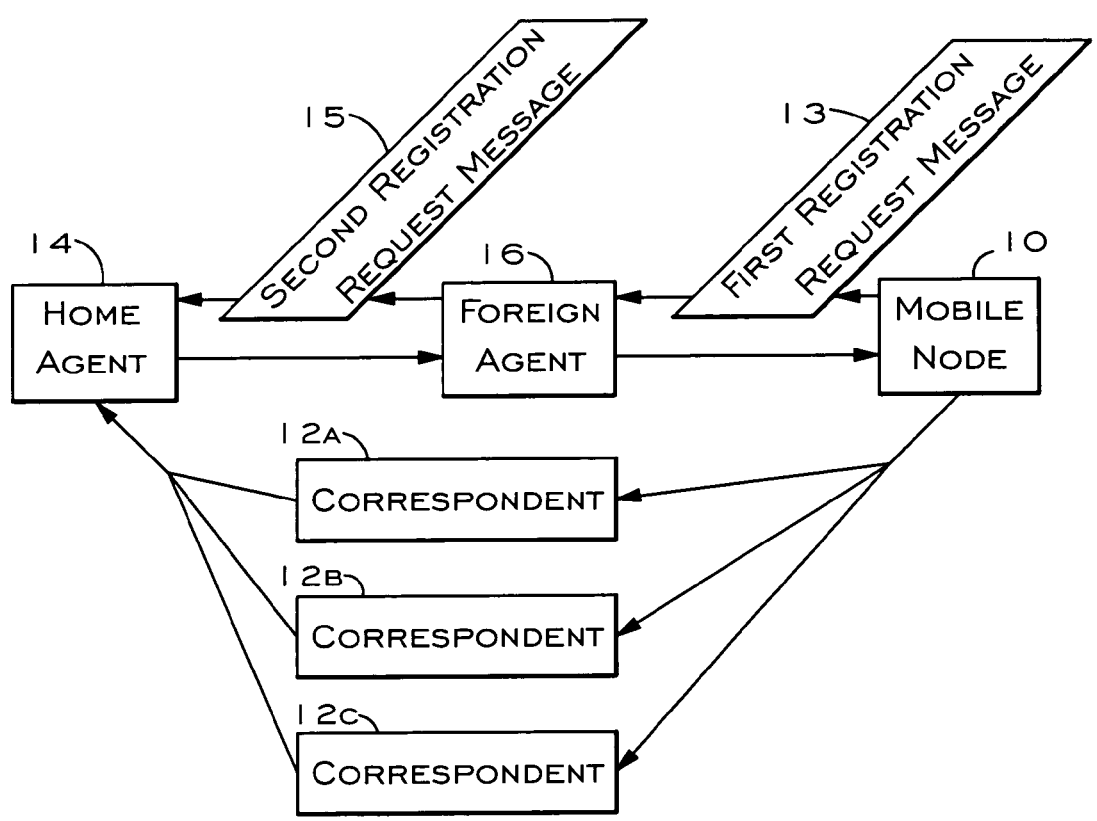
FIG. 1 illustrates the architecture of a mobile networking system.

As illustrated in FIG. 1, a system enables IP communications between a mobile node 10 and correspondent nodes 12a, 12b, and 12c, in which the mobile node 10 receives packet data addressed to the home address of the mobile node 10. The mobile node 10 may be, for example, a CDMA 2000 mobile phone. However, the mobile node 10 may be a different mobile node, such as a laptop computer provided with an 802.11 Internet connection or other types of mobile connections to an IP network. The correspondent nodes 12a-c may be an IP server such as a Web server or other network node addressable by an IP address. The correspondent nodes 12a-c may be stationary nodes, or they may themselves be mobile nodes.

A home agent 14 is provided in the mobile node's home network, i.e. the network to which packet data addressed to the mobile node is routed. Packet data sent from the correspondent nodes 12a-c and addressed to the home address of the mobile node is routed to the home agent 14 Home agent 14 then forwards the data to the mobile node 10 through a foreign agent 16. The mobile node may send packet data to the correspondent nodes 12a-12c by tunneling the data back from the foreign agent 16 to the home agent 14 and then to the correspondent nodes 12a-12c, or it may, as illustrated in FIG. 1, send the data directly to the correspondent nodes 12a-12c.

In a mobile networking session such as a mobile IP session, the home agent 14 is configured to operate such that packets addressed to the mobile node 10 that are received at the home agent 14 are forwarded to the mobile node 10 via the foreign agent 16. To forward packets to the mobile node 10, the home agent 14 tunnels the packets to a care-of address. The care-of address identifies the endpoint of the tunnel. The endpoint of the tunnel may be the foreign agent 16, in which case the care-of address is a foreign agent care-of address. Alternatively, the endpoint of the tunnel may be the mobile node 10, in which case the care-of address is a co-located care-of address, or another location may serve as the endpoint of the tunnel. Where the tunnel endpoint is not the mobile node 10, the tunnel endpoint employs a link-layer mechanism or other technique to send the packets to the mobile node 10.

Where a foreign agent care-of address is employed, the foreign agent 16 is configured as the endpoint of the tunnel so that packets tunneled by the home agent 14 are received at the foreign agent and are sent, preferably via a link-layer protocol, to the mobile node 10. Alternatively, where a co-located care-of address is employed, the foreign agent 16 is configured to send tunneled packets to the mobile node 10 at the co-located care-of address using, for example, ordinary IP packet routing.

Figure 2A:
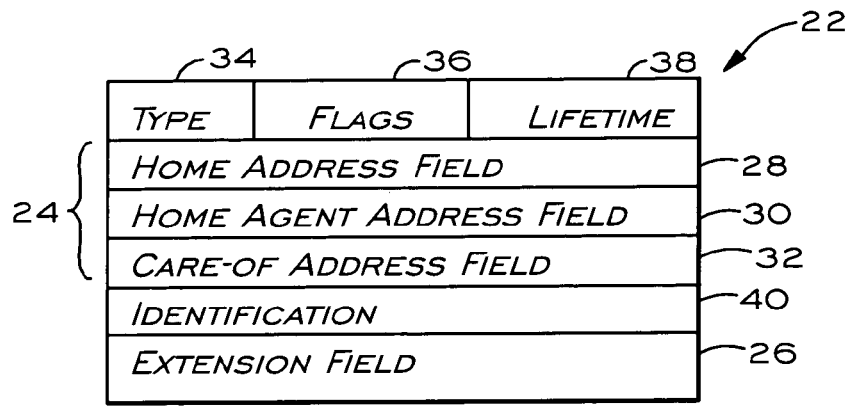
FIGS. 2a and 2b illustrate the structure of a registration request message.
Figure 2B:
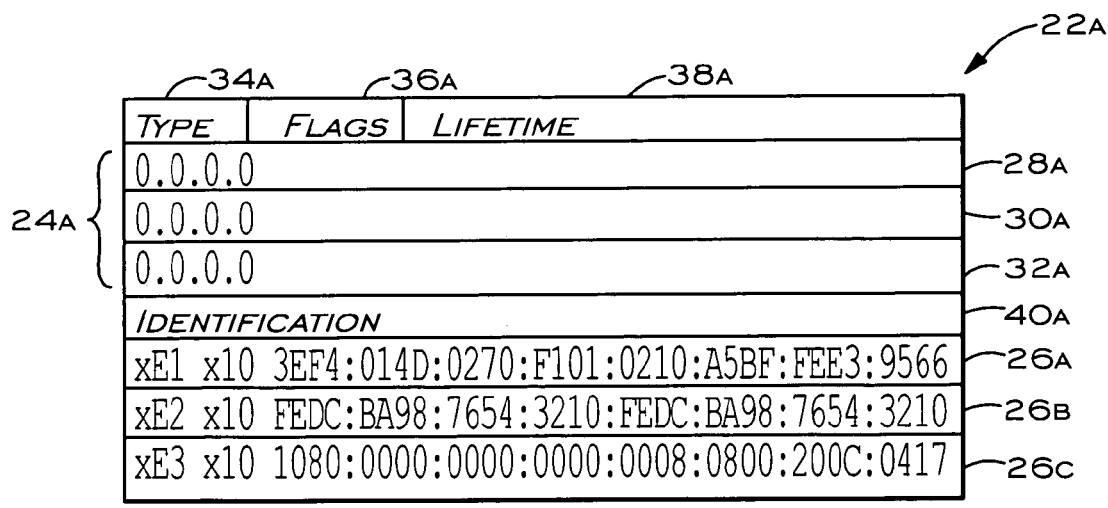

In a method of establishing mobile IP communications, the mobile node 10 sends a first registration request message 13 (FIG. 1) to the foreign agent 16. The first registration request message may be sent in response to an agent advertisement message, as described in RFC-2002 and RFC-3220. The first registration request message may have the format of messages 22 and 22a, as illustrated in FIG. 2, having data fields including address fields 24, 24a and extension fields 26, 26a, 26b, 26c. The address fields 24, 24a include a home address field 28, 28a, a home agent field 30, 30a, and a care-of address field 32, 32a. In an embodiment in which the registration request message is a mobile IP registration message, the messages 22, 22a further includes a type field 34, 34a, a set of flags 36, 36a, a lifetime field 38, 38a, and an identification field 40, 40a, as described in RFC-2002 and RFC-3220. The registration request messages 22, 22a may be sent in a UDP datagram.

After the foreign agent 16 receives the first registration request message (e.g., message 22 of FIG. 2a), the foreign agent 16 selects a home address value, a home agent address value, and a care-of address value from the registration request message. The foreign agent 16 may be provided with request interpretation logic (e.g., request interpretation logic 205 of FIG. 4) to select mobile routing address values, such as the home address, home agent address, and/or care-of address.

Figure 3:
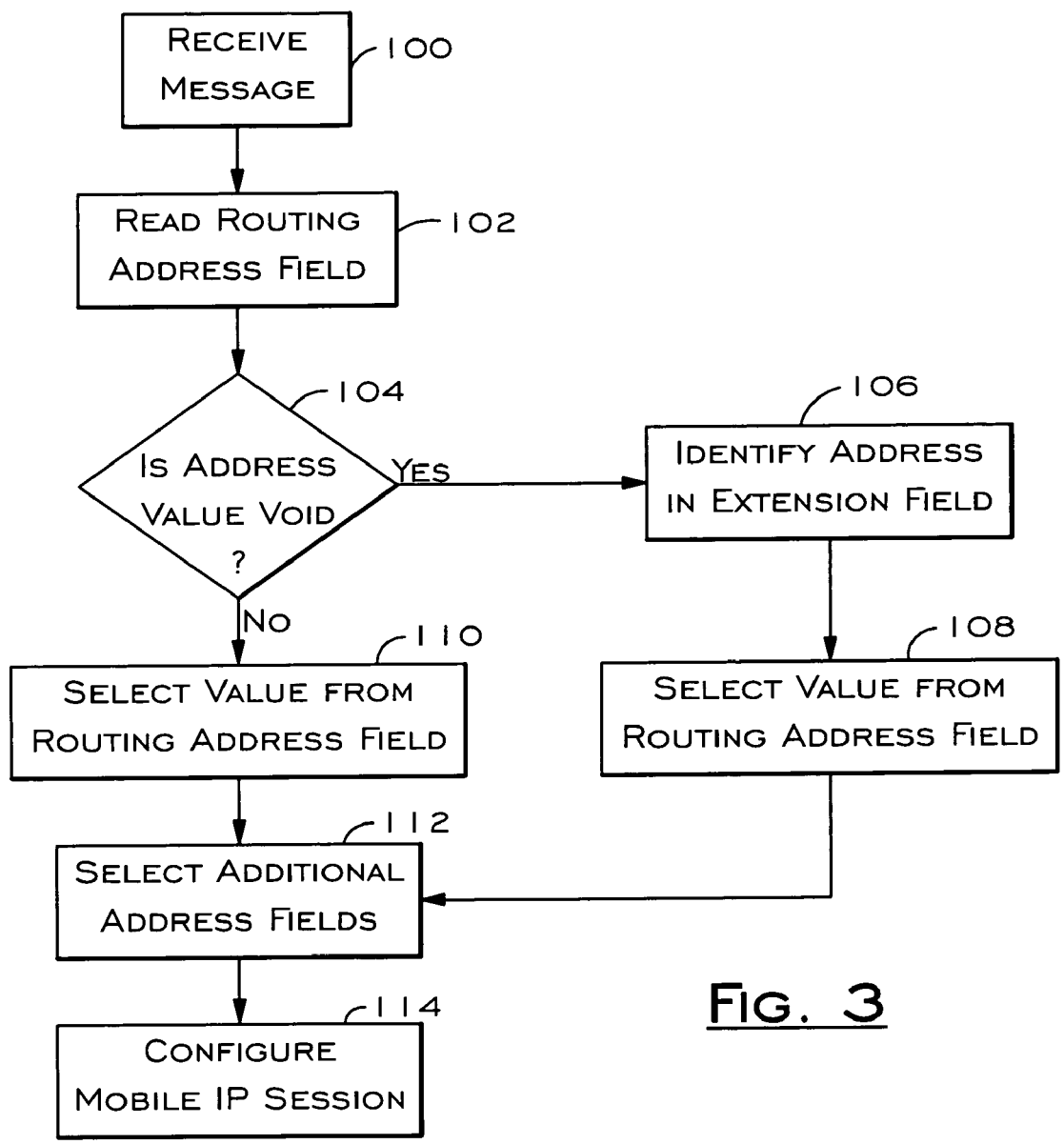
FIG. 3 is a flow chart illustrating steps in the interpretation of a registration request message.

The operation of the request interpretation logic is illustrated in FIG. 3. After the foreign agent 16 receives the registration request message 22 at step 100, the message interpretation logic reads an address value from one of the routing address fields 24. At step 104, the message interpretation logic may determine whether the address value read in step 102 is a void address value. If the address value is a void address value, the message interpretation logic, in step 106, identifies a substitute routing address value in the extension field 26. The message interpretation logic, in step 108 overrides the void address value by selecting the substitute routing address value from the extension field 26 as the selected routing address value. If, at step 104, the routing address field is determined not to include a void address value, then at step 110 the message interpretation logic selects the home address value in the home address field 102 as the selected home address value. At step 112, the address interpretation logic may select other routing addresses from the message 22, either by testing for void address values in the routing address field or by simply reading the routing address from the routing address field. After selecting the routing addresses, the agent node may, at step 114, configure a mobile IP session using the selected routing addresses.

In an alternative embodiment, the address interpretation logic determines whether a substitute address is provided in the extension field before testing for void address values, or without testing for void address values. If a substitute address associated with a routing address is provided in the extension field, then the address interpretation logic may override the address value in the routing address field regardless of whether the value in the routing address field is a void address value.

If the message interpretation logic determines that an address value is void but that no substitute address is provided in an extension field, the message interpretation logic may interpret the message to mean, for example, that a valid address is to be assigned by the agent node from the agent nodes' address pool.

The extension field may include extensions in a type-length-value format, such as the format described in RFC-2002. Each extension may store one or more substitute routing addresses. The extensions may be vendor-specific attributes as described in RFC-2002. In one embodiment, each extension has a type-length-value format and stores a single substitute address. Table 1, below, illustrates three extensions, each of which includes a single substitute routing address, as illustrated in fields 26a-c of FIG. 2b.

TABLE 1

| TYPE | LENGTH | DATA |
| --- | --- | --- |
| xE1 | x10 | 3EF4:014D:0270:F101:0210:A5BF:FEE3:9566 |
| xE2 | x10 | FEDC:BA98:7654:3210:FEDC:BA98:7654:3210 |
| xE3 | x10 | 1080:0000:0000:0000:0008:0800:200C:0417 |

In the extensions of Table 1, xE1 may be interpreted as the hexadecimal type code for the home address, xE2 as the type code for the home agent address, and xE3 as the type code for the care-of address. The specific type code chosen for different routing addresses may differ in different implementations. The length code for each of the extensions in Table 1 represents the number of bytes allotted to the data field, which, in these examples, is x10, the hexadecimal code for sixteen bytes. The data field in each of the extensions of Table 1 is a sixteen-byte IPv6 substitute address.

Where the message 22 is a registration request message in a Mobile IPv4 system, the address fields 24 are each long enough only to store a four-byte IPv4 address. In an embodiment where one or more of the routing addresses in the registration request message 22 is a sixteen-byte IPv6 substitute address, the home agent and foreign agent may be configured to provide a mobile networking connection in which one or more of the nodes—the foreign agent, the home agent, and the mobile agent—are addressed using an IPv6 address. A mobile networking connection may be provided in which some nodes are addressed by an IPv4 address and other nodes are addressed by an IPv6 address.

Where the message 22 is a registration request message in a Mobile IPv4 system, void address values may be the address values 0.0.0.0 (as illustrated in fields 28a, 30a, and 32a of FIG. 2b) or 255.255.255.255. Alternatively, other address values may be designated in a particular embodiment as void address values, by, for example, storing specific void address values in a computer memory accessible to the request interpretation logic or by rule-based designations. For example, the request interpretation logic may include a rule that an address value is void if its first decimal value (e.g., the "251" in 251.167.143.70) is higher than 239.

In some embodiments, the request interpretation logic may be operative to select an address value from the extension field even where an address value in the routing address fields 24 is not a void address value. For example, if the request interpretation logic determines that a routing address field includes a valid address and that the extension field includes a corresponding valid substitute address, the request interpretation logic may interpret the two addresses to refer to a single multihomed host. If an address value in the routing address fields includes a void address value and a corresponding substitute address value in the extension field that is itself a void address value (for example, the IPv6 address values 00:00:00:00:00:00 or ff:ff:ff:ff:ff:ff), the request interpretation logic may interpret the address value to be undefined.

After the foreign agent node 16 has received the message 22, it may send a second message 15 to the home agent node 14 at the selected home agent address. The message may have the same format as the registration request message 22 (FIG. 2*a*), including a home address field, a home agent field, a care-of address field, and an extension field. The message sent to the home agent node 14 may be a second Mobile IPv4 registration request message. When the home agent node 14 receives the message sent by the foreign agent node 16, message interpretation logic in the home agent selects routing addresses from the message as described above with respect to FIG. 3, and the home agent node is configured to forward, via the foreign agent node 16, packets addressed to the mobile node 10. The configuration of the home agent node 14 may involve setting up a pipeline between the home agent 14 and the foreign agent 16, where a foreign-agent care-of address is used, or between the home agent 14 and the mobile node 10 when a co-located care-of address is used.

Once the home agent node 14 has received the second registration request message, it may send a registration reply message to the foreign agent node 16. The registration reply message may include a code field that indicates to the mobile node 10 whether the home agent node has accepted the registration. A registration reply message from the home agent node 14 may be forwarded to the mobile node 10. The foreign agent node 16 may likewise send a registration reply message to the mobile node 10 with a code field indicating whether the foreign agent node has accepted the registration. A registration reply message may be used that does not include a care-of address field or substitute care-of address. Registration reply messages may be interpreted by message interpretation logic to read routing addresses as described above with respect to FIG. 3.

Various methods of tunneling packet data from the home agent node 14 en route to the mobile node 10 may be used, such as IP in IP encapsulation, minimal encapsulation, or generic routing encapsulation.

Figure 4:
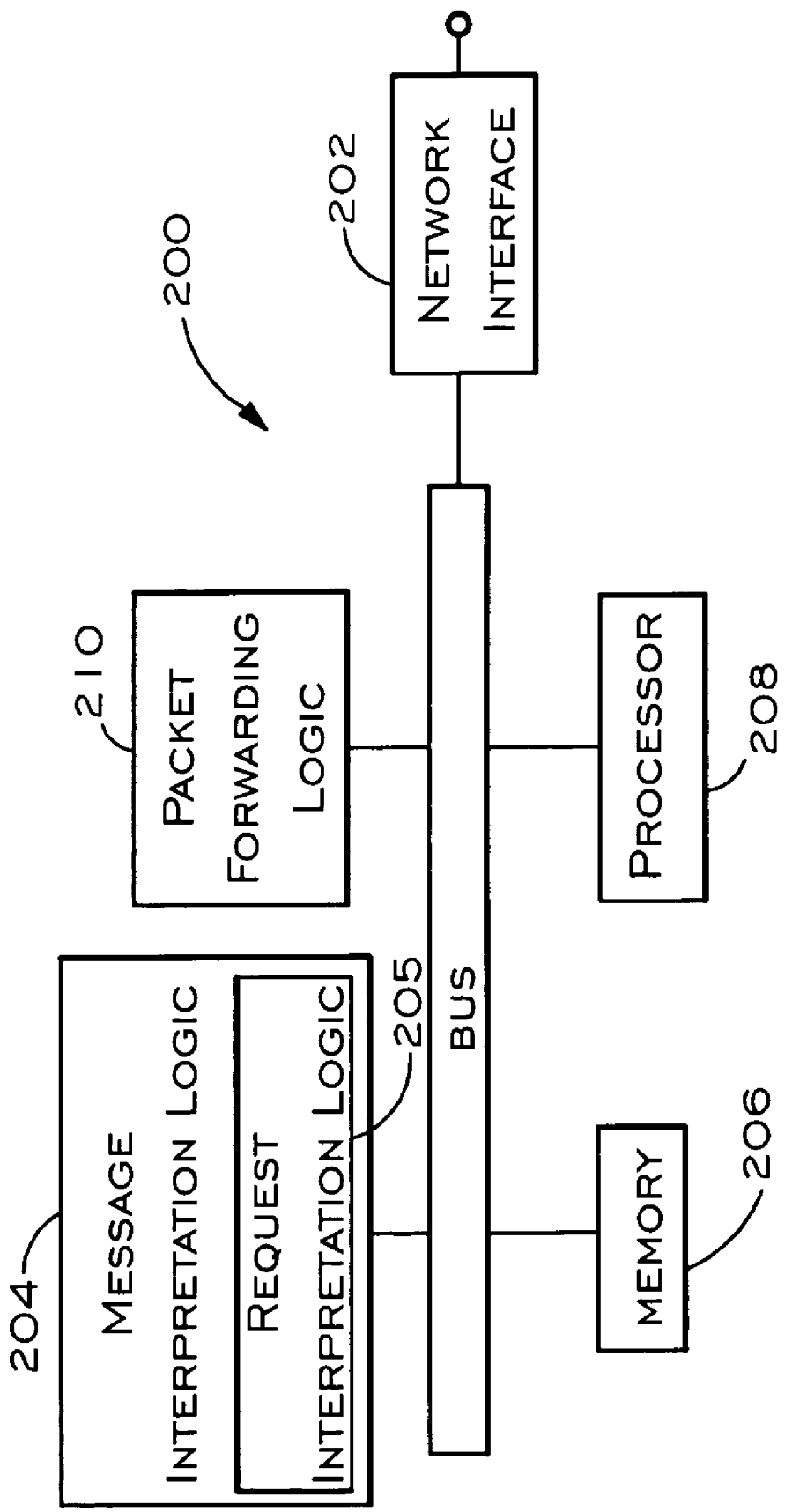
FIG. 4 is a block diagram of an agent node.

An exemplary agent node 200 is illustrated in FIG. 4. The node 200 includes a network interface 202 for sending and receiving messages and/or packet data, and message interpretation logic 204 for selecting addresses in registration request and/or registration response messages. The message interpretation logic may be implemented as machine executable instructions stored in a computer memory 206 and executed by a processor 208. The agent node 200 further includes packet forwarding logic 210. After the agent node 200 receives a registration request message associated with a mobile node, request interpretation logic 205 in the message interpretation logic 204 selects a home address, a home agent address, and a care-of address. The packet forwarding logic 210 is then configured to provide a mobile networking session for the mobile node. Where the agent node 200 is operated as a home agent node, the packet forwarding logic 210 identifies data addressed to the mobile node at the selected home address and forwards the data to the selected care-of address. Where the agent node 200 is operated as a foreign agent node and a foreign agent care-of address is used, the packet forwarding logic 210 may operate as a tunnel endpoint to unencapsulate packet data tunneled from the home agent node. In that case, the agent node 200 may send the packet data to the mobile node over a link layer connection. Alternatively, where the agent node 200 is operated as a foreign agent node and a co-located care-of address is used, the packet forwarding logic 210 may send encapsulated packet data to the mobile node, where it can be unencapsulated by the mobile node, the mobile node being the tunnel endpoint. The packet forwarding logic 210 may be implemented as machine executable instructions stored in the computer memory 206 and executed by the processor 208. Each of the components of the agent node 200 may communicate over a data bus 212. Executable instructions and/or source code instructions for implementing the packet forwarding logic 210 and/or the message interpretation logic 204 may be provided on a computer-readable storage medium.

The different portions of the functions of the agent node 200 may be performed in different computers, such as different servers in a subnet. A node as described herein may be implemented as a collection of computers, such as routers, on a subnet.

It should be noted that a single agent node 200 might act at the same time as a foreign agent node and as a home agent node. For example, the agent node 200 may be a foreign agent node in a mobile networking session for one mobile node and a home agent node in another mobile networking session for another mobile node.

The configuration of the agent node 200 to provide a mobile networking session for a mobile node may include providing the packet forwarding logic 210 with mobile routing addresses associated with the mobile networking session. For example, where the agent node is acting as a home agent node, the packet forwarding logic 210 may be provided with a home address and an associated care-of address that is stored in the memory 206. Then, when the packet forwarding logic identifies packet data directed to the home address, it forwards the identified data to the associated care-of address.

It should be understood that the programs, processes, methods and systems described herein are not related or limited to any particular type of computer or network system (hardware or software), unless indicated otherwise. Various types of general purpose or specialized computer systems supporting the IP networking may be used with or perform operations in accordance with the teachings described herein.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, more or fewer steps may be used, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method of establishing mobile network communications, comprising:
   receiving at an agent node a first message requesting a mobile network session with a mobile node, the first message including a home address field, a care-of address field, and an extension field, the extension field including at least one substitute address;
   selecting a home address, wherein the home address is selected from the home address field if the home address field does not include a void address value and from the extension field if the home address field includes a void address value;
   selecting a care-of address, wherein the care-of address is selected from the care-of address field if the care-of field does not include a void address value and from the extension field if the care-of address field includes a void address value; and
   configuring the agent node to establish a mobile network session with the mobile node, wherein packet data addressed to the selected home address is forwarded to the selected care-of address.

2. The method of claim 1, wherein the agent node is a foreign agent node and the first message includes a home agent address field, further comprising:
   selecting a home agent address, wherein the home agent address is selected from the home agent address field if the home agent address field does not include a void address value and from the extension field if the home agent address field includes a void address value; and
   sending a second message to a home agent at the selected home agent address.

3. The method of claim 2 wherein the first message is a first registration request message and the second message is a second registration request message.

4. The method of claim 1 wherein the first message is a first registration request message.

5. The method of claim 1, wherein the agent node is a home agent node, the step of configuring the agent node including configuring the home agent node to identify packet data addressed to the selected home address and to forward the identified packet data to the selected care-of address.

6. The method of claim 1, wherein the agent node is a foreign agent node, the step of configuring the agent node including configuring the foreign agent node to send, to the mobile node, packet data that has been forwarded to the selected care-of address.

7. The method of claim 1, wherein the home address field and the care-of address fields are four-byte address fields.

8. The method of claim 7, wherein the at least one substitute address is a sixteen-byte address.

9. A method of establishing mobile network communications, comprising:
   receiving at an agent node a first message associated with a mobile node, the first message including a first mobile routing address field, a second mobile routing address field, and an extension field, wherein the extension field includes a first substitute address;
   selecting a first mobile routing address to be the first substitute address in the extension field;
   selecting a second mobile routing address from the first message; and
   configuring the agent node to establish a mobile network session with the mobile node, wherein packet data addressed to one of mobile routing addresses is forwarded to the mobile node through the other of mobile routing addresses.

10. The method of claim 9, wherein the first mobile routing address is either a care-of address or a home agent address.

11. The method of claim 9, wherein the first mobile routing address field includes a void address value.

12. The method of claim 9, wherein the extension field includes a second substitute address, and wherein the step of selecting the second mobile routing address includes selecting the second mobile routing address to be the second substitute address.

13. A method of interpreting a message, comprising:
    receiving a mobile Internet Protocol registration request message, the registration request message having an extension field and address fields, wherein the address fields include a home address field, a home agent field, and a care-of address field;
    identifying at least one of the address fields having a void address;
    identifying a substitute address in the extension field; and
    overriding the void address with the substitute address.

14. A method of interpreting a message, comprising:
    receiving a mobile Internet Protocol registration reply message, the registration reply message having an extension field and address fields, wherein the address fields include a home address field and a home agent field;
    identifying at least one of the address fields having a void address;
    identifying a substitute address in the extension field; and
    overriding the void address with the substitute address.

15. A method of operating a home agent node, comprising:
    receiving a message, the message including a home address field, a care-of address field, and an extension field;
    selecting a home address from the home address field or the extension field;
    selecting a care-of address from the care-of address field or the extension field;
    receiving packet data addressed to the selected home address; and
    forwarding the packet data to the selected care-of address,
    wherein at least one of the home address and the care-of address fields includes a void address value, and wherein at least one of the home address and the care-of address, corresponding to the address field including a void address value, is selected from the extension field.

16. The method of claim 15, wherein the step of forwarding the packet data includes tunneling the packet data to the selected care-of address.

17. The method of claim 15, wherein the message is a registration request message.

18. A method of operating a foreign agent node, comprising:
    receiving a first message associated with a mobile node, the first message including a home address field, a home agent address field, a care-of address field, and an extension field;
    selecting a home address from the home address field or the extension field;
    selecting a home agent address from the home agent address field or the extension field;
    selecting a care-of address from the care-of address field or the extension field; and sending a second message to a home agent at the selected home agent address, the second message including the selected home address and the selected care-of address;

wherein at least one of the home address, the home agent address, and the care-of address fields includes a void address value, and wherein at least one of the home address, the home agent address, and the care-of address, corresponding to the address field including a void address value, is selected from the extension field.

19. The method of claim 18, further comprising receiving packet data sent by the home agent and sending the packet data to the mobile node.

20. The method of claim 18, wherein the first message is a first registration request message and the second message is a second registration request message.

21. An agent node in a network comprising:
a network interface for receiving a message requesting a mobile network session with a mobile node, the first message including a home address field, a care-of address field, and an extension field, the extension field including at least one substitute address;

request interpretation logic operative to select a home address, wherein the home address is selected from the home address field if the home address field does not include a void address value and from the extension field if the home address field includes a void address value;

the request interpretation logic further being operative to select a care-of address, wherein the care-of address is selected from the care-of address field if the care-of field does not include a void address value and from the extension field if the care-of address field includes a void address value; and packet forwarding logic operative to provide a mobile networking session wherein packet data addressed to the to the mobile node at the selected home address is sent to the mobile node through the selected care-of address.

22. The agent node of claim 21, wherein the agent node is a home agent node, the packet forwarding logic being operative to identify packet data addressed to the selected home address and to send the identified packet data to the selected care-of address.

23. The agent node of claim 21, wherein the agent node is a foreign agent node, the packet forwarding logic being operative to receive packet data forwarded by a home agent at the selected home agent node and to send the forwarded packet data to the mobile node.

24. An agent node in a network comprising:
a network interface for receiving a first registration request from a mobile node, the first registration request including a first mobile routing address field, a second mobile routing address field, and an extension field, wherein the first mobile routing address field includes a void address value, and wherein the extension field includes a first substitute address;

request interpretation logic operative to select a first mobile routing address to be the first substitute address in the extension field;

the request interpretation logic further being operative to select a second mobile routing address from the registration request; and packet forwarding logic operative to establish a mobile network session with the mobile node, wherein packet data addressed to one of the mobile routing addresses is forwarded to the mobile node through the other of the mobile routing addresses.

25. A system for interpreting a message, comprising:
a network interface operative to receive a mobile Internet Protocol registration request message, the registration request message having an extension field and routing address fields, wherein the routing address fields include a home address field and a home agent address field;

message interpretation logic operative i) to identify at least one of the routing address fields having a void address, ii) to identify a substitute address in the extension field; and iii) to override the void address with the substitute address.

26. A system for interpreting a message, comprising:
a network interface operative to receive a mobile Internet Protocol registration request message, the registration request message having an extension field and at least two routing address fields;

message interpretation logic operative i) to identify at least one of the routing address fields having a void address, ii) to identify a substitute address in the extension field; and iii) to override the void address with the substitute address.

27. A method of interpreting a message, comprising:
receiving a mobile Internet Protocol registration request message, the registration request message having an extension field and a routing address field;

identifying a substitute address in the extension field corresponding to the routing address field; and overriding an address value in the routing address field with the substitute address.

* * * * *